(12) United States Patent
Standridge

(10) Patent No.: US 12,256,721 B2
(45) Date of Patent: Mar. 25, 2025

(54) FISH ATTRACTION DEVICE INCLUDING A MULTI-HAMMER THUMPER

(71) Applicant: David J. Standridge, Waxahachie, TX (US)

(72) Inventor: David J. Standridge, Waxahachie, TX (US)

(*) Notice: Subject to any disclaimer, the term of this patent is extended or adjusted under 35 U.S.C. 154(b) by 211 days.

(21) Appl. No.: 18/081,817

(22) Filed: Dec. 15, 2022

(65) Prior Publication Data

US 2023/0180733 A1 Jun. 15, 2023

Related U.S. Application Data

(60) Provisional application No. 63/290,001, filed on Dec. 15, 2021.

(51) Int. Cl.
*A01K 85/01* (2006.01)

(52) U.S. Cl.
CPC ................... *A01K 85/017* (2022.02)

(58) Field of Classification Search
CPC ...... A01K 85/01; A01K 85/017; G10D 13/00; G10D 13/01; G10D 13/08; A01M 29/00; A01M 29/16; A01M 29/20; A01M 29/22; A63H 5/00
USPC ........ 43/42.31, 17.1; 446/81, 297, 397, 404, 446/418, 422
See application file for complete search history.

(56) References Cited

U.S. PATENT DOCUMENTS

| | | | | |
|---|---|---|---|---|
| 859,620 A * | 7/1907 | Sandell | ................... | A63H 5/00 84/102 |
| 2,259,629 A * | 10/1941 | Fisher | ................... | A63H 5/00 446/414 |
| 3,448,649 A * | 6/1969 | Sakujiro | ................... | A63H 5/00 84/404 |
| 3,456,543 A * | 7/1969 | Matsuzo | ................... | G10F 1/08 84/404 |
| 4,380,132 A * | 4/1983 | Atkinson | ................ | A01K 85/01 43/42.31 |
| 5,925,838 A * | 7/1999 | Meng-Suen | .............. | G10F 1/08 84/404 |
| 6,351,908 B1 * | 3/2002 | Thomas | ................ | A01M 29/06 340/384.1 |
| 7,325,357 B2 * | 2/2008 | Wiskur | .................. | A01K 85/01 43/42.31 |
| 2003/0040251 A1 * | 2/2003 | Todokoro | ................ | A63F 9/305 446/153 |

* cited by examiner

OTHER PUBLICATIONS https://forums.ozarkanglers.com/topic/70687-new-thumper-toy/ (See attached PDF document showing screenshot) (Year: 2020).*

*Primary Examiner* — Peter M Poon
*Assistant Examiner* — Marisa V Conlon
(74) *Attorney, Agent, or Firm* — Parker Justiss, P.C.

(57) ABSTRACT

Provided is a fish attraction device. The fish attraction device, in at least one aspect, includes a motor, the motor having an output shaft configured to rotate about a rotational axis. The fish attraction device, in accordance with this aspect, may further include first and second cams rotationally coupled to the output shaft about the rotational axis. The fish attraction device, in accordance with this aspect, may further include a first thumper configured to move to create a first thumping pattern as the first cam rotates with the output shaft about the rotational axis, as well as a second thumper configured to move to create a second thumping pattern as the second cam rotates with the output shaft about the rotational axis, the first and second thumping patterns collectively providing a rhythmic thumping pattern designed to attract fish.

20 Claims, 2 Drawing Sheets

FISH ATTRACTION DEVICE INCLUDING A MULTI-HAMMER THUMPER

CROSS-REFERENCE TO RELATED APPLICATION

This application claims the benefit of U.S. Provisional Application Ser. No. 63/290,001, filed on Dec. 15, 2021, entitled "MULTI/DUAL HAMMER THUMPER (M/DHT)," commonly assigned with this application and incorporated herein by reference in its entirety.

TECHNICAL FIELD

This application is directed, in general, to a fish attraction device and, more specifically, to a fish attraction device including multiple thumpers.

BACKGROUND

Although there are variations, fishing can be basically described as one person against one fish wherein real bait or an artificial lure is used to catch a fish that happened to be in the vicinity of the fisherman. Different species of fish are attracted by various sensory perceptions or combinations thereof, such as sight, sound, water vibrations, smell, etc. Accordingly, if you can find the correct sensory perception for a particular species of fish, your odds of catching that particular species of fish are greatly improved.

BRIEF DESCRIPTION

Figure 1:
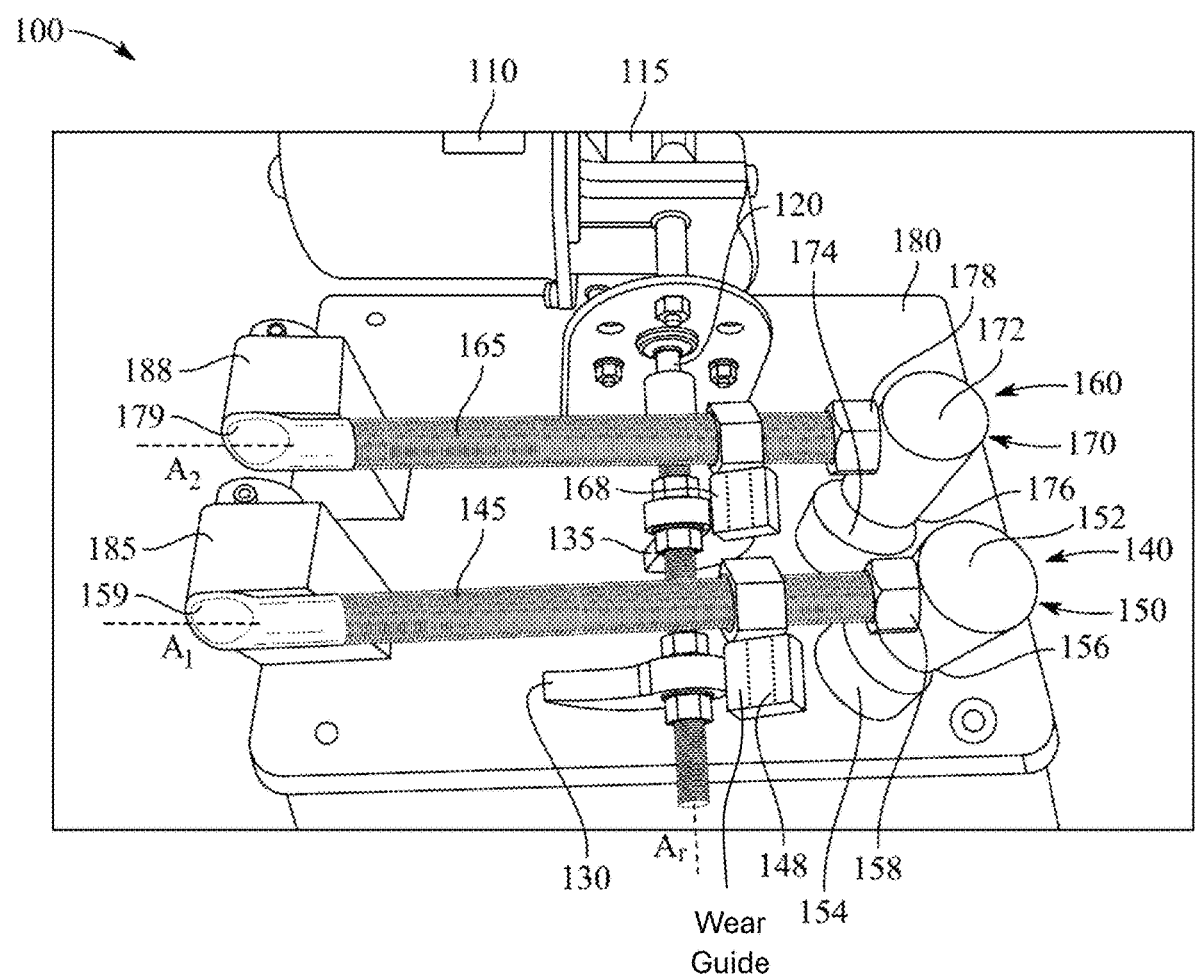
Figure 2:
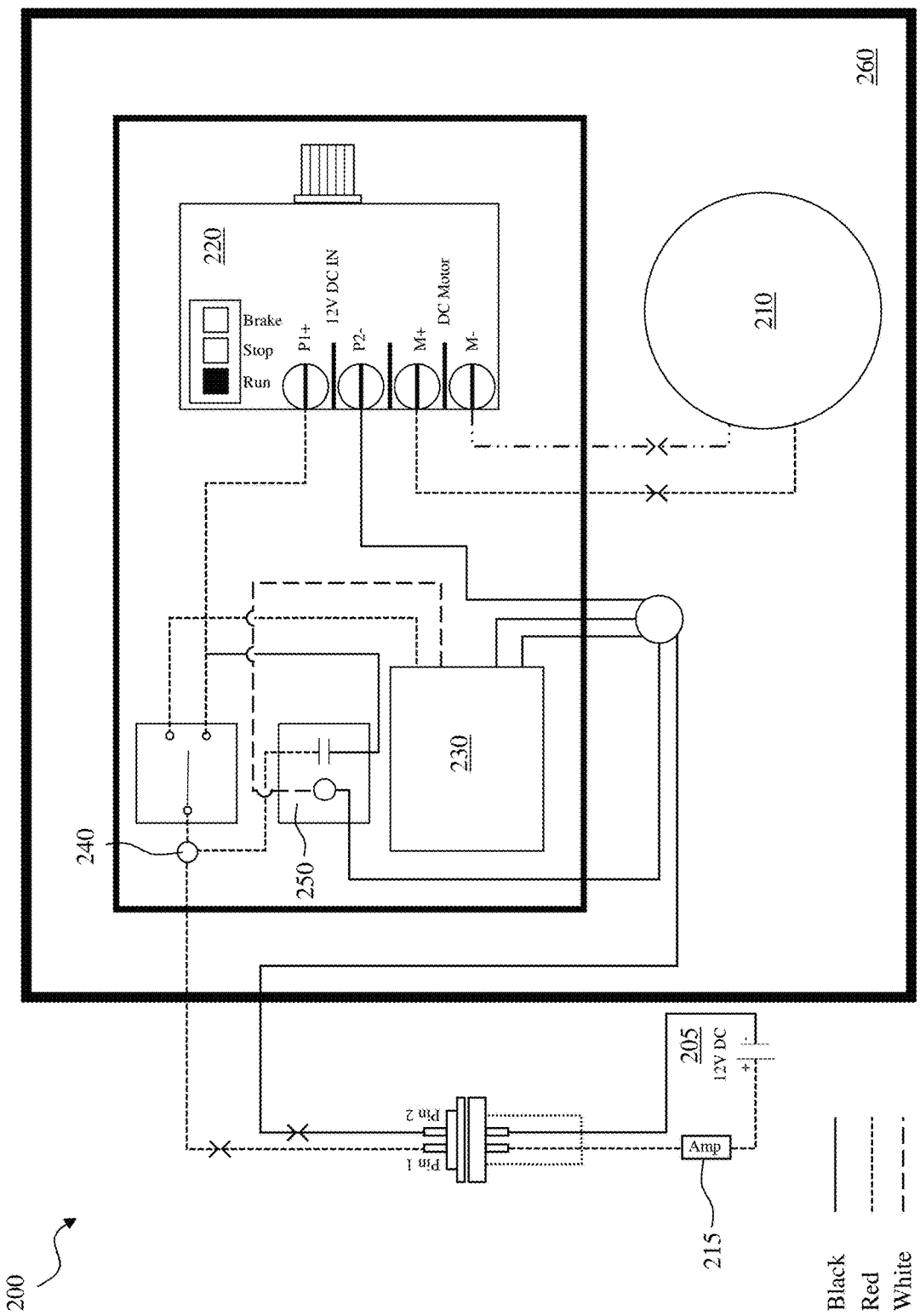

Reference is now made to the following descriptions taken in conjunction with the accompanying drawings, in which:

FIG. 1 illustrates one embodiment of a fish attraction device designed, manufactured and/or operated according to one or more embodiments of the disclosure; and FIG. 2 illustrates a diagram (e.g., wiring diagram) of an alternative embodiment of a fish attraction device designed, manufactured and/or operated according to one or more alternative embodiments of the disclosure.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form, and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Unless otherwise specified, use of the terms "connect," "engage," "couple," "attach," or any other like term describing an interaction between elements is not meant to limit the interaction to direct interaction between the elements and may also include indirect interaction between the elements described.

The disclosure addresses the challenge of catching fish. The present disclosure has recognized that a rhythmic thumping pattern created when two or more thumpers strike a surface proximate a body of water that the fish are located may greatly improve a user's odds of catching fish. Specifically, the present disclosure has designed a fish attraction device that attracts fish to the fisherman (e.g., often located within a boat in a large body of water) using a pattern of sounds and/or vibrations using the aforementioned rhythmic thumping pattern (e.g., transferred through the hull of the boat when used). In at least one embodiment, the fish attraction device produces a frequency of less than 400 hz, if not a frequency of less than 200 hz, in addition to emitting a low thud repetitive sound.

The present disclosure has, for the first time, recognized that certain species of fish are naturally attracted to the rhythmic thumping pattern achievable with the two or more thumpers. Prior to this disclosure, it was generally understood that such a rhythmic thumping pattern created by two or more thumpers would in fact scare away the fish. In contrast to that which was previously known, a fish attraction device designed, manufactured and/or operated according to one or more embodiments of the disclosure has been field tested on catfish, bass (e.g., striped bass, white bass, hybrid bass, etc.) drum and crappie, all of which were significantly attracted to the rhythmic thumping pattern created using the multiple thumpers. It is believed that walleye, perch, and saltwater species (e.g., sea trout, redfish, black drum, snapper, etc.), among others, would equally be attracted to the rhythmic thumping pattern created using multiple thumpers.

Turning to FIG. 1, illustrated is one embodiment of a fish attraction device 100 designed, manufactured and/or operated according to one or more embodiments of the disclosure. The fish attraction device 100, in one or more embodiments, includes a motor 110. While not shown in FIG. 1, the motor 110, in one or more embodiments, would be coupled to a power source, such as a 12 volt battery.

In one or more embodiments, the fish attraction device 100 additionally includes an output shaft 120 coupled to the motor 110, the output shaft 120 configured to rotate about a rotational axis ($A_r$). In one or more embodiments, the output shaft 120 forms a portion of the motor 110. In yet other embodiments, such as shown, the motor 110 couples to a gearbox 115, and the output shaft 120 forms a portion of the gearbox 115. In at least one embodiment, the motor 110 and/or gearbox 115 are capable of providing at least produce 4.4 ft-lb of rated torque.

In the illustrated embodiment, the fish attraction device 100 additionally includes first and second cams 130, 135 rotationally coupled to the output shaft 120 about the rotational axis ($A_r$). The first and second cams 130, 135 may take on many different shapes while remaining within the scope of the present invention. In at least one embodiment, such as shown, the first and second cams 130, 135 are separate cams. In yet another embodiment, the first and second cams 130, 135 could form at least a portion of a camshaft coupled to the output shaft 120.

The fish attraction device 100, in one or more embodiments, may further include a first thumper 140 and a second thumper 160. In yet other embodiments, the fish attraction device might include a third thumper (not shown), a fourth thumper (not shown), etc. while remaining within the scope of the present disclosure. In the illustrated embodiment, the first thumper 140 is configured to move from a first downward state (e.g., as shown) to a first upward state and then back down to the first downward state to create a first thumping pattern as the first cam 130 rotates with the output shaft 120 about the rotational axis ($A_r$). In the illustrated embodiment, the second thumper 160 is configured to move from a second downward state (e.g., as shown) to a second upward state and then back down to the second downward state to create a second thumping pattern as the second cam 135 rotates with the output shaft 120 about the rotational axis ($A_r$). Accordingly, as the output shaft 120 rotates, the first and second thumping patterns collectively provide a rhythmic thumping pattern designed to attract fish, as discussed above.

In at least one embodiment, the first thumper 140 includes a first handle 145 and a first hammer 150 and the second thumper 160 includes a second handle 165 and a second hammer 170. For example, in at least this one embodiment, the first hammer 150 includes a first metal hammer portion 152 and the second hammer 170 includes a second metal hammer portion 172. Further to this embodiment, the first metal hammer portion 152 and the second metal hammer portion 172 may be exchangeable/interchangeable for different weight options, as might be required to create different frequency first and second thumping patterns, and thus to help attract different species of fish.

In the embodiment of FIG. 1, the first hammer 150 additionally includes a first tip portion 154 coupled to a first bottom end 156 of the first metal hammer portion 152 and the second hammer 170 additionally includes a second tip portion 174 coupled to a second bottom end 176 of the second metal hammer portion 172. In accordance with at least one embodiment, the first tip portion 154 is a first rubber tip portion and the second tip portion 174 is a second rubber tip portion. In accordance with at least one other embodiment, the first tip portion 154 is a first replaceable tip portion and the second tip portion 174 is a second replaceable tip portion. In yet one other embodiment, the first tip portion 154 is a first replaceable rubber tip portion and the second tip portion 174 is a second replaceable rubber tip portion. The rubber tips, in at least one embodiment, comprise 50-80 durometer rubber that converts the first thumping pattern and second thumping pattern from higher pitch patterns to lower pitch patterns when the first and second metal hammer portions 152, 172 move back down to the first downward state and second downward state, respectively.

In one or more embodiments, the motor 110 is coupled to a base plate 180. In at least one embodiment, the base plate 180 is a separate base plate, such as that shown. For example, the base plate 180 could be a low carbon steel base plate (e.g., $\frac{1}{8}^{th}$ inch thick A36 material) and remain within the scope of the present disclosure. The low carbon steel, in accordance with at least one embodiment, provides structural integrity and/or adds weight (e.g., for better contact when positioned on floor or deck of a boat, or alternatively floor or deck of a boat dock). In yet another embodiment, the base plate 180 is the floor or deck of a boat, or alternatively the floor or deck of a boat dock positioned over a body of water. Accordingly, the present disclosure is not limited, unless otherwise stated, to any specific material and/or location for the base plate 180.

In accordance with the disclosure, the first hammer 150 is configured to strike the base plate 180 to create the first thumping pattern when moving back down to the first downward state. Similarly, the second hammer 170 is configured to strike the base plate 180 to create the second thumping pattern when moving back down to the second downward state. In one or more embodiments, such as that shown, the first hammer 150 is coupled proximate a first axial end 158 of the first handle 145 and the second hammer 170 is coupled proximate a second axial end 178 of the second handle 165. Further to the embodiment shown, a first opposing axial end 159 of the first handle 145 is coupled to the base plate 180 and a second opposing axial end 179 of the second handle 165 is coupled to the base plate 180.

In one or more embodiments, the fish attraction device 100 further included a first mounting block 185 coupling the first opposing axial end 159 of the first handle 145 to the base plate 180, and a second mounting block 188 coupling the second opposing axial end 179 of the second handle 165 to the base plate 180. While the first and second mounting blocks 185, 188 may comprise many different shapes and/or materials and remain within the scope of the disclosure, in at least one embodiment the first and second mounting blocks 185, 188 comprise polyethylene plastic (e.g., such as HDPE). In accordance with the illustrated embodiment of FIG. 1, the first and second mounting blocks 185, 188 set the proper height for the pivot motion of the first thumper 140 and the second thumper 160, as well as act as a bearing.

In the illustrated embodiment of FIG. 1, the first cam 130 is laterally offset from a first axis ($A_1$) created by the first handle 145 and the second cam 135 is laterally offset from a second axis ($A_2$) created by the second handle 165. For example, in one or more embodiments, a first member 148 extends from the first handle 145, the first member 148 coupling the first laterally offset cam 130 and the first thumper 140, and a second member 168 extends from the second handle 165 coupling the second laterally offset cam 135 and the second thumper 160. In one or more embodiments, as is shown, a first adjustable wear guide is positioned between the first member 148 and the first cam 130, and a second adjustable wear guide is positioned between the second member 168 and the second cam 135. In at least one embodiment, the first and second adjustable wear guides are nylon (e.g., nylon polygon/hexagon) wear guides. The first and second adjustable wear guides, in at least one embodiment, provide a smooth glide when coming into contact with the first and second cams 130, 135, which in turn provides a smooth and quiet process of lifting and dropping the first and second thumpers 140, 160. In at least one embodiment, the first and second adjustable wear guides may be rotated (e.g., by hand) as needed.

In accordance with at least one unique embodiment of the disclosure, a rotational location of the first and second cams 130, 135 relative to the output shaft 120 is adjustable to adjust a timing between the first thumping pattern and the second thumping pattern, for example to thereby modify the rhythmic thumping pattern for a particular species of fish. For example, in at least one embodiment, the first and second cams 130, 135 are adjustable steel cams that can be changed for different rhythmic patterns. In at least one embodiment, the first and second cams are adjustably rotationally offset from 30 degrees to 45 degrees. Nevertheless, other ranges are within the scope of the disclosure, as the first and second cams 130, 135 may be rotated a full 360 degrees in one or more embodiments. In at least one embodiment, one of the first and second cams 130, 135 remains fixed, while the other of the second and first cams 135, 130, is moved. For example, a serrated flange nut next to ones of the first and second cams 130, 135 may be loosened while the cam is rotated, and then retightened to achieve the desired rhythmic thumping pattern.

In one or more embodiments, the motor 110 is a variable speed motor, the speed of the motor 110 adjustable to change a rate of reoccurrence of the first thumping pattern and the second thumping pattern for a particular species of fish. In at least one embodiment (e.g., not shown as being on the back side of the motor 110), the fish attraction device 100 additionally includes a user adjustable potentiometer coupled to the variable speed motor, the user adjustable potentiometer configured to change the rate of reoccurrence for the particular species of fish. For example, in at least one embodiment, the user adjustable potentiometer limits a number of revolutions of the output shaft 120 coupled to the motor 110 to 0-50 revolutions per minute. Other configurations are, however, within the scope of the disclosure.

Turning to FIG. 2, illustrated is a diagram (e.g., wiring diagram) of an alternative embodiment of a fish attraction device 200 designed, manufactured and/or operated according to one or more alternative embodiments of the disclosure. The fish attraction device 200, in the illustrated embodiment, includes a motor 210 coupled to a power source 205 (e.g., 12V DC battery), for example via a fuse 215. In the illustrated embodiment, a user adjustable potentiometer 220 is coupled between the power source 205 and the motor 210, for example to change a rate of reoccurrence of the first and second thumping patterns. The fish attraction device 200, in accordance with one embodiment, may additionally include a remote controller 230 for starting, stopping, braking, and/or changing the rate of reoccurrence of the first and second thumping patterns remotely.

Further to the embodiment of FIG. 2, the fish attraction device 200 could have a toggle switch 240, the toggle switch optionally having three positions (e.g., manual, off and remote). In at least one embodiment, the operator can use a remote to turn on and off the system by having the toggle switch 240 in the remote mode. In case of battery failure or receiver failure the toggle switch 240 can be switched and/or operated in manual mode. In the embodiment of FIG. 2, the fish attraction device 200 additionally includes a relay 250.

In at least one embodiment, the components (e.g., all of the components) of the fish attraction device 200 are contained within a waterproof and impact resistant case 260 (e.g., Seahorse SE540). For example, the case 260 might be 14.9" L, 12.1" W, and 9.6" H, and weigh about 5.6 lbs., have a buoyancy capacity of 39 lbs., and be certified IP67. However, other embodiments may exist wherein a different sized case 260 is used, for example one that could include a self-contained lithium battery. In accordance with one embodiment, a total weight of the fish attraction device 200, including the case 260, would be between 15 lbs. and 30 lbs., and in one embodiment between 20 lbs. and 24 lbs. (e.g., about 22 lbs.).

Aspects disclosed herein include:

A. A fish attraction device, the fish attraction device including: 1) a motor; 2) an output shaft coupled to the motor, the output shaft configured to rotate about a rotational axis ($A_r$); 3) first and second cams rotationally coupled to the output shaft about the rotational axis; 4) a first thumper, the first thumper configured to move from a first downward state to a first upward state and then back down to the first downward state to create a first thumping pattern as the first cam rotates with the output shaft about the rotational axis ($A_r$); and 5) a second thumper, the second thumper configured to move from a second downward state to a second upward state and then back down to the second downward state to create a second thumping pattern as the second cam rotates with the output shaft about the rotational axis, the first and second thumping patterns collectively providing a rhythmic thumping pattern designed to attract fish.

Aspect A may have one or more of the following additional elements in combination: Element 1: wherein the first thumper includes a first handle and a first hammer and the second thumper includes a second handle and a second hammer. Element 2: wherein the first hammer includes a first metal hammer portion and the second hammer includes a second metal hammer portion. Element 3: wherein the first metal hammer portion and the second metal hammer portion are interchangeable for different weight options. Element 4: wherein the first hammer additionally includes a first tip portion coupled to a first bottom end of the first metal hammer portion and the second hammer additionally includes a second tip portion coupled to a second bottom end of the second metal hammer portion. Element 5: wherein the first tip portion is a first rubber tip portion and the second tip portion is a second rubber tip portion. Element 6: wherein the first tip portion is a first replaceable tip portion and the second tip portion is a second replaceable tip portion. Element 7: wherein the motor is coupled to a base plate, and further wherein the first hammer is configured to strike the base plate to create the first thumping pattern when moving back down to the first downward state, and further wherein the second hammer is configured to strike the base plate to create the second thumping pattern when moving back down to the second downward state. Element 8: wherein the first hammer is coupled proximate a first axial end of the first handle and the second hammer is coupled proximate a second axial end of the second handle, and further wherein a first opposing axial end of the first handle is coupled to the base plate and a second opposing axial end of the second handle is coupled to the base plate. Element 9: further including a first mounting block coupling the first opposing axial end of the first handle to the base plate and a second mounting block coupling the second opposing axial end of the second handle to the base plate. Element 10: wherein the first and second mounting blocks comprise polyethylene plastic. Element 11: wherein the first cam is laterally offset from a first axis ($A_1$) created by the first handle and the second cam is laterally offset from a second axis ($A_2$) created by the second handle. Element 12: wherein a first member extending from the first handle couples the first laterally offset cam and the first thumper and a second member extending from the second handle couples the second laterally offset cam and the second thumper. Element 13: further including a first adjustable wear guide positioned between the first member and the first cam and a second adjustable wear guide positioned between the second member and the second cam. Element 14: wherein the first and second adjustable wear guides are nylon polygon wear guides. Element 15: wherein a rotational location of the first and second cams relative to the output shaft is adjustable to adjust a timing between the first thumping pattern and the second thumping pattern to thereby modify the rhythmic thumping pattern for a particular species of fish. Element 16: wherein the first and second cams are adjustably rotationally offset from 30 degrees to 45 degrees. Element 17: wherein the motor is a variable speed motor, the speed of the motor adjustable to change a rate of reoccurrence of the first thumping pattern and the second thumping pattern for the particular species of fish. Element 18: further including a user adjustable potentiometer coupled to the variable speed motor, the user adjustable potentiometer configured to change the rate of reoccurrence for the particular species of fish. Element 19: wherein the user adjustable potentiometer limits a number of revolutions of the output shaft to 0-50 revolutions per minute.

Those skilled in the art to which this application relates will appreciate that other and further additions, deletions, substitutions and modifications may be made to the described embodiments.

What is claimed is:

1. A fish attraction device, comprising:
   a motor;
   an output shaft coupled to the motor, the output shaft configured to rotate about a rotational axis ($A_r$);
   first and second cams rotationally coupled to the output shaft about the rotational axis;
   a first thumper, the first thumper configured to move from a first downward state to a first upward state and then back down to the first downward state to create a first thumping pattern as the first cam rotates with the output shaft about the rotational axis ($A_r$); and
   a second thumper, the second thumper configured to move from a second downward state to a second upward state and then back down to the second downward state to create a second thumping pattern as the second cam rotates with the output shaft about the rotational axis, the first and second thumping patterns collectively providing a rhythmic thumping pattern designed to attract fish.

2. The fish attraction device as recited in claim 1, wherein the first thumper includes a first handle and a first hammer and the second thumper includes a second handle and a second hammer.

3. The fish attraction device as recited in claim 2, wherein the first hammer includes a first metal hammer portion and the second hammer includes a second metal hammer portion.

4. The fish attraction device as recited in claim 3, wherein the first metal hammer portion and the second metal hammer portion are interchangeable for different weight options.

5. The fish attraction device as recited in claim 3, wherein the first hammer additionally includes a first tip portion coupled to a first bottom end of the first metal hammer portion and the second hammer additionally includes a second tip portion coupled to a second bottom end of the second metal hammer portion.

6. The fish attraction device as recited in claim 5, wherein the first tip portion is a first rubber tip portion and the second tip portion is a second rubber tip portion.

7. The fish attraction device as recited in claim 5, wherein the first tip portion is a first replaceable tip portion and the second tip portion is a second replaceable tip portion.

8. The fish attraction device as recited in claim 2, wherein the motor is coupled to a base plate, and further wherein the first hammer is configured to strike the base plate to create the first thumping pattern when moving back down to the first downward state, and further wherein the second hammer is configured to strike the base plate to create the second thumping pattern when moving back down to the second downward state.

9. The fish attraction device as recited in claim 8, wherein the first hammer is coupled proximate a first axial end of the first handle and the second hammer is coupled proximate a second axial end of the second handle, and further wherein a first opposing axial end of the first handle is coupled to the base plate and a second opposing axial end of the second handle is coupled to the base plate.

10. The fish attraction device as recited in claim 9, further including a first mounting block coupling the first opposing axial end of the first handle to the base plate and a second mounting block coupling the second opposing axial end of the second handle to the base plate.

11. The fish attraction device as recited in claim 10, wherein the first and second mounting blocks comprise polyethylene plastic.

12. The fish attraction device as recited in claim 2, wherein the first cam is laterally offset from a first axis ($A_1$) created by the first handle and the second cam is laterally offset from a second axis ($A_2$) created by the second handle.

13. The fish attraction device as recited in claim 12, wherein a first member extending from the first handle couples the first laterally offset cam and the first thumper and a second member extending from the second handle couples the second laterally offset cam and the second thumper.

14. The fish attraction device as recited in claim 13, further including a first adjustable wear guide positioned between the first member and the first cam and a second adjustable wear guide positioned between the second member and the second cam.

15. The fish attraction device as recited in claim 14, wherein the first and second adjustable wear guides are nylon polygon wear guides.

16. The fish attraction device as recited in claim 2, wherein a rotational location of the first and second cams relative to the output shaft is adjustable to adjust a timing between the first thumping pattern and the second thumping pattern to thereby modify the rhythmic thumping pattern for a particular species of fish.

17. The fish attraction device as recited in claim 16, wherein the first and second cams are adjustably rotationally offset from 30 degrees to 45 degrees.

18. The fish attraction device as recited in claim 16, wherein the motor is a variable speed motor, the speed of the motor adjustable to change a rate of reoccurrence of the first thumping pattern and the second thumping pattern for the particular species of fish.

19. The fish attraction device as recited in claim 18, further including a user adjustable potentiometer coupled to the variable speed motor, the user adjustable potentiometer configured to change the rate of reoccurrence for the particular species of fish.

20. The fish attraction device as recited in claim 19, wherein the user adjustable potentiometer limits a number of revolutions of the output shaft to 0-50 revolutions per minute.

* * * * *